April 10, 1945.                R. F. E. STEGEMAN                2,373,610
                                   LENS MOUNT
                               Filed Sept. 24, 1943
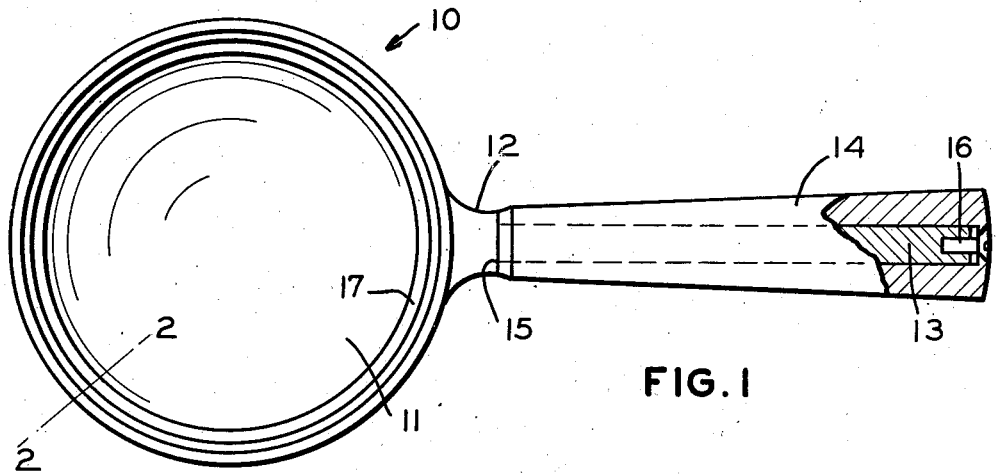
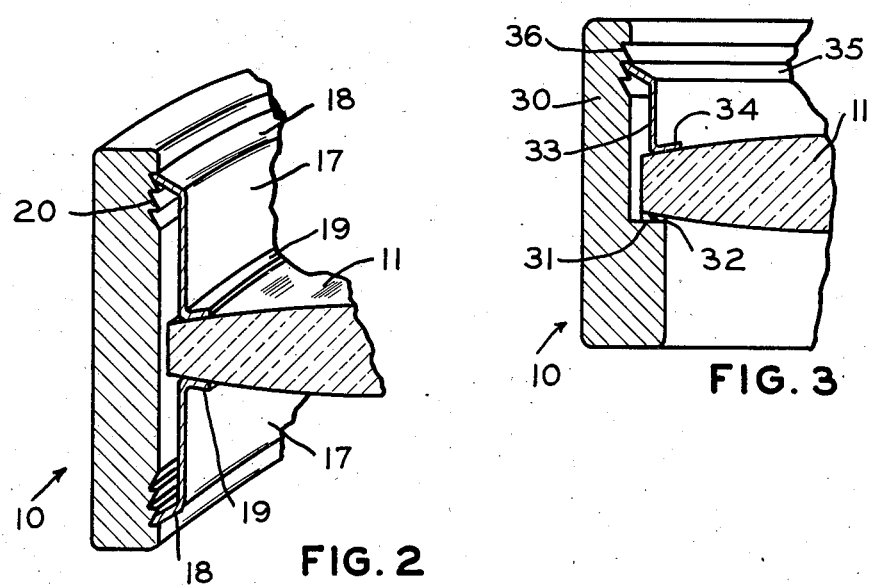
RAYMOND F. E. STEGEMAN
INVENTOR Patented Apr. 10, 1945

2,373,610

UNITED STATES PATENT OFFICE 2,373,610

LENS MOUNT

Raymond F. E. Stegeman, Greece, N. Y., assignor to Bausch & Lomb Optical Company, Rochester, N. Y., a corporation of New York Application September 24, 1943, Serial No. 503,673

4 Claims. (Cl. 88—57)

The present invention relates to optical instruments and, more particularly, to a means for mounting a lens in such an instrument.

Although the device selected to illustrate the present invention comprises a reading glass or magnifier, it is to be understood that the invention is not limited to such an instrument for lenses may be mounted according to the present invention in many different types of optical instruments.

Many of the previously composed reading glasses have been formed with a frame comprising a split ring of substantially rigid material extending about the lens. The ring is usually provided with an internal groove to receive the edge of the lens which is beveled for reception in the groove. To secure the lens in a frame, the lens is positioned in the groove and the frame then drawn about the lens to tightly clamp the lens in position within the frame.

The frame is usually formed of a size to receive a lens of a predetermined diameter and thickness, and if the lens is formed with a diameter larger than the predetermined one, the frame when clamped about the lens sets up strain in the same often sufficient to break the lens during the assembly operation. If the strain is not sufficient to break the lens during the assembly operation, it was often the cause of lens breakage, as the lens is rigidly mounted in the frame, when the frame receives a slight knock or jar in use. Furthermore, if the lens has too small a diameter, it could not be securely mounted, or if too small, it would have to be scrapped or reworked for use with a smaller frame.

These difficulties are obviated by the present invention for means are provided for resiliently and yieldingly mounting in one-piece frames lenses of varying diameters. In the preferred embodiment of the invention, the lens is mounted in the frame between two identical cylindrical members or bands of resilient material. Each band is formed with an outwardly extending flange, having a diameter slightly in excess of the innner diameter of the frame, adapted to engage an annular groove formed in the inner surface of the frame, and an inwardly extending flange adapted to circumscribe a face of the lens adjacent the edge portion thereof.

The assembly of the magnifier of the present invention is completed merely by placing the lens in the frame with the lens engaging flanges of a pair of the bands engaging the opposite faces of the lens and then forcing the bands inwardly until the outwardly extending flanges thereof snap into the grooves of the frame. As each band resiliently urges the lens against the other, the lens is resiliently mounted within the frame and is cushioned against shock.

The inner diameter of the inwardly extending flanges of the bands is less than the inner diameter of the frame so that lenses of diameters varying from slightly less than the inner diameter of the frame to ones having a diameter slightly larger than the diameter of the inwardly extending flanges can be accommodated by the mounting means of the present invention. Furthermore, lenses having varying thicknesses at the edge portion may be mounted in the frame of the present invention for the inner surface thereof is formed with a plurality of annular grooves, any one of which is selectively engageable with the outwardly extending flanges of the mounting bands.

The peripheral edge portions of the lenses mounted in the frame of the present invention are concealed by the mounting bands and the lenses need not be edged, in fact, lenses having irregularities or chips in the edge portions thereof can be used without impairing the appearance of the reader.

In a modified form of the present invention, the frame is formed with an internal lens receiving seat and the lens is resiliently held thereon by a single mounting band such as used in the preferred form of the invention. In the assembly of the modified form of the invention, the lens is placed in the seat and the single mounting band is placed so that the lens engaging surface thereof is contacting the exposed face of the lens. The band is then forced into the frame until the outwardly extending flange thereof snaps into one of the grooves formed on the inner wall of the frame to resiliently lock the lens on the seat.

Other features and advantages of the present invention will be apparent from the following descriptions taken in connection with the accompanying drawing in which:

Fig. 1 is a top plan view of a magnifier embodying the present invention.

Fig. 2 is a sectional view taken on line 2—2 of Fig. 1.

Fig. 3 is a view similar to Fig. 2, but showing another embodiment of the invention.

The illustrated embodiment of the present invention, referrring now to the drawing, comprises a frame 10 in which a lens 11 is to be mounted. In the preferred method of forming the device, the frame 10 and a shank 12 are die-cast as a unit. The shank 12 is formed with a reduced portion 13 and a hollow handle 14 is slipped onto the latter until the one end thereof engages a shoulder 15 formed by the reduced portion 13 of the shank. The handle is held in place on the shank by a screw 16 passing through an opening formed in the handle and threaded into a tapped opening formed in the end face of the reduced portion of the shank. The lens 11 is held within the frame 10 by two identical cylindrical members or mounting bands 17. Each band is formed about one edge thereof with an outwardly extending flange 18 and about the opposite edge with a lens engaging flange 19 formed by turning the edge of the band back on itself.

In mounting the lens 11 in the frame 10, the lens is inserted within the frame, and a band 17 disposed on opposite sides of the lens with the lens engaging flanges 19 thereof in contact with the opposite faces of the lens. Pressure is now applied to the mounting bands until the flange 18 of each member is engaged in one of a series of annular grooves 20 formed in the inner surface of the frame 10 adjacent to the upper and lower edges thereof.

The outer diameter of the flanges 18 of the mounting bands is slightly larger than the inner diameter of the frame, but as the bands are formed of resilient material, they yield an amount sufficient to permit the edges of the flanges 18 to ride over the teeth formed by the grooves 20 until the flanges are engaged in the grooves determined by the thickness of the lens.

It should be obvious now that a lens having a thickness different than that illustrated can be mounted within the frame for the flanges 18 can be caused to engage either the outermost or innermost grooves of the two series, depending upon the thickness of the lens to be mounted. Thus, in the device of the present invention the thickness of the lenses to be mounted in the frame need not be closely held to any specified thickness.

The grooves should be so formed as to prevent the flanges 18 from being accidently urged out of the frame after the lens has been mounted, and this can be accomplished quite easily by slightly undercutting the grooves during their forming operation. Since the bands are under compression after they are engaged in the grooves, they tend to return to the normal position, which causes the edges of the flange 18 to bite into the grooves and securely lock the lens in the frame.

It can be considered that the flange 19 of one band, after it is mounted within the frame, forms a lens engaging seat against which the lens is resiliently held by the other mounting band. The device of the present invention may be assembled therefore, by first mounting one of the bands within the frame, after which the lens can be placed on the seat formed by its flange 19 and the other mounting band then urged against the lens until the flange 18 thereof is engaged in a groove of the frame.

The edges of lenses to be mounted in frames of the present invention are not used to mount the frame and consequently no expensive finishing operation is necessary as in the prior devices where the lenses were mounted by clamping a split ring about the edges thereof. Furthermore, as the mounting bands 17 will conceal the edge and peripheral face portions of a lens mounted in the frame of the present invention, lenses having chips or other defects in the edges thereof can be used without impairing the performance or appearance of the device.

It should also be obvious now that lenses having diameters slightly less than the inner diameter of the frame 10 to ones having diameters somewhat in excess of the inner diameter of the mounting bands can be successfully mounted in the frame. There is little, if any, danger of a lens having a diameter slightly larger than the inner diameter of the mounting band shifting relative to the frame for the surfaces of lenses used in magnifiers of the type illustrated are usually spherical and the caming action between the lens surface and the lens engaging flanges will tend to center the lens relative to the frame 10.

In a modified form of the present invention shown in Fig. 3, the frame 30 is integrally formed with an annular internal lens seat 31 which preferably is formed during the die casting operation. In this form of the device of the present invention, the lens is inserted within the frame 30 until it engages the seat 31 which may, if desired, carry a gasket 32 of some suitable resilient material. A mounting band 33, such as the bands 17 earlier described, is used to hold the lens on the seat 31 in the same manner by forcing the band 33 into the frame until the lens engaging portion 34 is in contact with the one face of the lens and the outwardly extending flange 35 thereof is engaged in one of the grooves 36 formed in the inner surface of the frame 30.

It will be seen that, in both forms of the invention illustrated, the lens is firmly but yet resiliently held within the frame end, due to the particular mounting means employed, there is little if any danger of the lens breaking during the assembly operation. As the lens is resiliently held within the frame, the frame is cushioned against shock, which in similar devices where the lenses are rigidly held, is often the cause of lens breakage.

Although the now preferred embodiments of the device of the present invention have been illustrated and described herein, it is to be understood that the invention need not be limited thereby for the invention is susceptible to changes in form and detail within the scope of the appended claims.

I claim:

1. In a device of the type described, a hollow frame having a groove formed in the inner surface thereof adjacent the opposite ends thereof; a lens disposed within said frame; a pair of bands of resilient material disposed on opposite sides of said lens; and an outwardly extending flange formed on the opposite end portions of said bands and engaged in said grooves, the adjacent end portions of said bands engaging the opposite faces of said lens and resiliently holding said lens within said frame.

2. In a device of the type described, a lens; an annular frame surrounding said lens, said frame having a groove formed in its inner surface adjacent the opposite ends thereof; and a pair of bands of resilient material having inwardly bent edge portions engaging the opposite faces of said lens and outwardly bent edge portions engaging said grooves, the periphery of said inwardly bent portions of said bands being spaced from the inner surface of said frame whereby lenses of different diameters may be resiliently held within said frame.

3. In a device of the type described, an annular frame having a plurality of grooves formed in its inner surface adjacent the one end thereof; an annular seat formed integral with the inner surface of said frame; a lens mounted on said seat; and a band of resilient material formed at one end thereof with an inwardly extending portion engaging the exposed face of said lens and at the opposite end thereof with an outwardly extending portion resiliently engaged in one of said grooves depending upon the thickness of said lens.

4. In a device of the type described, a lens; an annular one piece frame surrounding said lens, said frame having a plurality of grooves formed on its inner surface adjacent the opposite ends thereof; and a pair of bands of resilient material disposed on opposite sides of said lens and having inwardly bent end portions engaging the opposite faces of said lens, each band being formed at the opposite end thereof with an outwardly extending flange, said flanges being selectively engageable in a pair of said grooves to resiliently mount the lens in said frame.

RAYMOND F. E. STEGEMAN.